United States Patent Office 3,134,819
Patented May 26, 1964

3,134,819
NOVEL TRIFLUOROMETHYL DERIVATIVES OF SUBSTITUTED DIOLS
Maxwell Gordon, Elkins Park, and Irwin J. Pachter, Erdenheim, Pa., assignors to Smith Kline & French Laboratories, Philadelphia, Pa., a corporation of Pennsylvania
No Drawing. Filed Nov. 14, 1960, Ser. No. 68,647
7 Claims. (Cl. 260—618)

This invention relates to novel organic compounds and more specifically to certain vic-diols embracing the trifluoromethyl group and possessing valuable pharmacological properties.

The compounds of our invention may be represented by the following general formula:

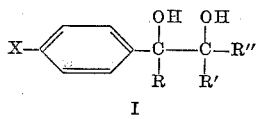

I wherein X is a member selected from the group consisting of $CF_3$—, $CF_3O$—, $CF_3S$—, and $CF_3SO_2$—; and R, R' and R" are selected from the group consisting of hydrogen, lower alkyl of from 1 to 3 carbon atoms, and phenyl, R, R', R" being the same only when representing lower alkyl.

The compounds of this invention possess anticonvulsive and mild tranquilizing properties. The compounds can be advantageously administered orally in any of the known pharmaceutical forms and demonstrate few if any untoward side effects.

The compounds of this invention are prepared by reacting an appropriate vic-hydroxy ketone with a Grignard reagent of the formula:

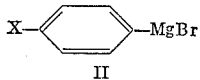

II

The conditions employed are analogous to those known and employed in the art for similar Grignard reactions of this type.

The preferred compounds of our invention are those wherein R, R' and R" represent methyl and X represents $CF_3$—.

The following examples will further serve to typify the mode of our invention, but should not be construed as limiting the scope thereof, the scope being defined by the appended claims.

Example 1

To 113 g. of p-trifluoromethylphenyl bromide in 1 l. of anhydrous ether is added 12.5 g. of magnesium turnings. When formation of this Grignard reagent is complete, a solution of 21 g. of 2-methyl-2-hydroxy-3-butanone in 50 ml. of anhydrous ether is added dropwise at such a rate so as to maintain a slow reflux. At the end of this time, the mixture is stirred for 10 hours and to it is added 100 ml. of saturated aqueous ammonium chloride solution, followed by an additional 100 ml. of 2 N hydrochloric acid. The mixture is stirred for 30 minutes, the layers then separated and the ethereal layer next evaporated to dryness. The residue is recrystallized from cyclohexane, clarified with charcoal and again recrystallized from cyclohexane to yield 2-(p-trifluoromethylphenyl)-3-methyl-2,3-butanediol, M.P. 98–99°.

Similarly by employing 122 g. of p-trifluoromethoxyphenyl bromide in place of p-trifluoromethylphenyl bromide, there is formed the corresponding Grignard reagent p-trifluoromethoxyphenyl magnesium bromide which when reacted with 2-methyl-2-hydroxy-3-butanone according to the above procedure yields 2-(p-trifluoromethoxyphenyl)-3-methyl-2,3-butanediol.

Likewise, p-trifluoromethylthiophenyl bromide and p-trifluoromethylsulfonylphenyl bromide are employed in preparation of the corresponding Grignard reagent and these in turn reacted with 2-methyl-2-hydroxy-3-butanone to yield respectively 2-(p-trifluoromethylthiophenyl)-3-methyl-2,3-butanediol and 2-(p-trifluoromethylsulfonylphenyl)-3-methyl-2,3-butanediol.

Example 2

An ethereal solution of p-trifluoromethylphenyl magnesium bromide is prepared in the manner of Example 1 and to it is added a solution of 24 g. of 3-methyl-3-hydroxy-2-pentanone in 50 ml. of ether in a dropwise manner so as to maintain a slow reflux. The mixture is then stirred for 10 hours and treated with 100 ml. of saturated aqueous ammonium chloride solution followed by 100 ml. of saturated aqueous ammonium chloride solution followed by 100 ml. of 2 N hydrochloric acid. The mixture is stirred for an additional 30 minutes, the layers separated and the ethereal layer evaporated to dryness. The solid residue so obtained is recrystallized from cyclohexane, clarified with charcoal and again recrystallized from cyclohexane to yield 2-(p-trifluoromethylphenyl)-3-methyl-2,3-pentanediol.

In a similar manner, equivalent quantities of the following compounds are subjected to the above procedure: 1-hydroxy-2-pentanone, 5-hydroxy-4-octanone, 4-ethyl-4-hydroxy-3-hexanone, 2,5-dimethyl-4-hydroxy-3-hexanone. There are thus obtained upon execution of the steps therein described the compounds 2-(p-trifluoromethylphenyl)-1,2-pentanediol, 4-(p-trifluoromethylphenyl)-4,5-octanediol, 3-(p-trifluoromethylphenyl)-4-ethyl-3,4-hexanediol, and 2,5-dimethyl-3-(p-trifluoromethylphenyl)-3,4-hexanediol.

Example 3

To the Grignard reagent prepared in Example 1 is added 31.4 g. of acetylphenylcarbinol in a dropwise fashion so as to maintain a slow reflux. After stirring for 10 hours, 100 ml. of saturated aqueous ammonium solution and 100 ml. of 2 N hydrochloric acid are added. Stirring is continued for 30 minutes, after which time the layers are separated and the organic layer evaporated to dryness. The residue which is thus formed is recrystallized from cyclohexane to yield 1-phenyl-2-(p-trifluoromethylphenyl)-1,2-propanediol.

In a similar manner methylbenzoylcarbinol is substituted for acetylphenylcarbinol in the above procedure and there is thus obtained 1-phenyl-1-(p-trifluoromethylphenyl)-1,2-propanediol.

Likewise by employing equivalent amounts of dimethylbenzoylcarbinol, acetylphenylmethylcarbinol, and benzoin, there are respectively obtained upon execution of the above procedure the compounds 1-phenyl-1-(p-trifluoromethylphenyl)-2-methyl-1,2-propanediol, 2-phenyl-3-(p-trifluoromethylphenyl)-2,3-butanediol, and 1-phenyl-2-(p-trifluoromethylphenyl)-ethylene glycol.

Example 4 p-Trifluoromethylthiophenyl magnesium bromide (prepared from 135 g. of p-trifluoromethylthiophenyl bromide and 12 g. of magnesium) is substituted for p-trifluoromethylphenyl magnesium bromide in the procedure of Example 2 and there is thus obtained the compound 2-(p-trifluoromethylthiophenyl)-3-methyl-2,3-pentanediol.

Similarly, by employing p-trifluoromethoxyphenyl bromide and preparing the corresponding Grignard reagent, there is obtained the use of this reagent in the procedure of Example 2, the compound 2-(p-trifluoromethoxyphenyl)-3-methyl-2,3-pentanediol.

Example 5

To 122 g. of p-trifluoromethoxyphenyl bromide in 1 l. of anhydrous ether is added 12.5 g. of magnesium turnings. When the formation of the Grignard reagent is complete, 28.6 g. of acetylphenylcarbinol is added in a dropwise fashion in the manner of Example 3. Upon completion of the reaction mixture as described in Example 3, there is obtained the compound 1-phenyl-2-(p-trifluoromethoxyphenyl)-1,2-propanediol.

Example 6 p-Trifluoromethylthiophenyl bromide is converted to the corresponding Grignard reagent in the manner heretofore described and treated with acetylphenylmethylcarbinol in the manner of Example 3. Upon completion of the steps therein described, there is obtained the compound 2-phenyl-3-(p-trifluoromethylthiophenyl)-2,3-butanediol.

Example 7

To 146 g. of p-trifluoromethylsulfonylphenyl bromide is added 12.5 g. of magnesium turnings in 1 l. of anhydrous ether. To this reagent is added 33.8 g. of dimethylbenzoylcarbinol in the manner of Example 3. Completion of the steps as therein described then yields the compound 1-phenyl-1-(p-trifluoromethylsulfonylphenyl)-2-methyl-1,2-propanediol.

We claim:
1. Compounds of the formula:

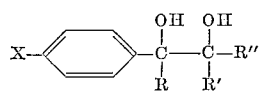

wherein X is a member selected from the group consisting of $CF_3-$, $CF_3S-$, $CF_3O-$, and $CF_3SO_2-$; and R, R', and R'' are members selected from the group consisting of hydrogen, lower alkyl and phenyl, R, R', and R'' being the same only when representing lower alkyl.

2. Compound according to claim 1 wherein X is $CF_3-$ and R, R' and R'' are lower alkyl.

3. Compounds according to claim 1 wherein X is $CF_3-$ and R and R' are lower alkyl and R'' is hydrogen.

4. 1-phenyl-2-(p-trifluoromethylphenyl)-1,2-propanediol.

5. 2-(p-trifluoromethylphenyl)-3-methyl-2,3-butanediol.

6. 2-phenyl-3-(p-trifluoromethylphenyl)2,3-butanediol.

7. 3-(p-trifluoromethylphenyl)-4-ethyl-3,4-hexanediol.

References Cited in the file of this patent

UNITED STATES PATENTS 2,812,363    Mills _____ Nov. 5, 1957

OTHER REFERENCES

Tarrant et al.: Journal Organic Chem., 24:238–239, 1959 (2 pages).